(12) United States Patent
Sheynin et al.

(10) Patent No.: US 8,127,283 B2
(45) Date of Patent: Feb. 28, 2012

(54) ENABLING GRAPHICAL NOTATION FOR PARALLEL PROGRAMMING

(75) Inventors: Yuriy E. Sheynin, Saint-Petersburg (RU); Alexey Y. Syschikov, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 1210 days.

(21) Appl. No.: 11/899,273

(22) Filed: Sep. 5, 2007

(65) Prior Publication Data

US 2009/0064115 A1    Mar. 5, 2009

(51) Int. Cl.
G06F 9/45 (2006.01)
G06F 11/00 (2006.01)
G06F 9/46 (2006.01)
G06F 9/44 (2006.01)

(52) U.S. Cl. .......... 717/149; 717/114; 717/125; 714/11; 718/106

(58) Field of Classification Search .................. None
See application file for complete search history.

(56) References Cited

U.S. PATENT DOCUMENTS

| | | | | |
|---|---|---|---|---|
| 5,999,729 | A * | 12/1999 | Tabloski et al. | 717/105 |
| 6,275,956 | B1 * | 8/2001 | On et al. | 717/125 |
| 7,853,937 | B2 * | 12/2010 | Janczewski | 717/149 |
| 2002/0054051 | A1 * | 5/2002 | Ladd | 345/700 |
| 2004/0107414 | A1 * | 6/2004 | Bronicki et al. | 717/105 |
| 2006/0059473 | A1 * | 3/2006 | Moler | 717/149 |
| 2007/0169042 | A1 * | 7/2007 | Janczewski | 717/149 |
| 2008/0163184 | A1 * | 7/2008 | Kanade | 717/149 |
| 2008/0201721 | A1 * | 8/2008 | Little et al. | 718/106 |
| 2008/0222620 | A1 * | 9/2008 | Little et al. | 717/149 |
| 2009/0307660 | A1 * | 12/2009 | Srinivasan | 717/114 |
| 2011/0047412 | A1 * | 2/2011 | Martin | 714/11 |

OTHER PUBLICATIONS

MPSoc-2005, pp. 1-14, <http://www.mpsoc-forum.org/2005/lectures.html>, 2005.*
Y. Sheynin, "Parallel Programming Model for Distributed Architecture MPSoC", Jul. 2005, St. Petersburg State University of Aerospace Instrumentation Russia, pp. 1-20 <www.mpsoc-forum.org/2005/slides/Sheynin.pdf>.*
Sheynin et al., "Object-Orientation in Parallel VSIPL Architecture", 2001, IEEE, pp. 277-280.*
Richard Goering, "SoC programming models needed", Jul. 14, 2005, EEITimes, pp. 1-2.*
Liu et al., "Study on Template for Parallel Computing in Visual Parallel Programming Platform", 2006 1st International Symposium on Pervasive Computing and Applications, , IEEE, pp. 476-481 <http://ieeexplore.ieee.org/search/searchresult.jsp?queryText=visual%20parallel%20programming>.*
Kwiatkowski et al., "Dynamic Process Communication in the GDE Environment", 2004, Springer-Verlag Berlin Heidelberg, pp. 389-396 <http://www.google.com/#q=GRAPHICAL+NOTATION+FOR+PARALLEL+PROGRAMMING>.*
Pazel et al., "Intentional MPI Programming in a Visual Development Environment", 2006 ACM, pp. 169-170 <http://dl.acm.org/results.cfm?query=visual%20parallel%20programming%20environment>.*
Peter Newton, et al., "Overview of VPE: A Visual Environment for Message-Passing," 1995, pp. 1-8.
The Mathworks, "Simulink®—Simulation and Model-Based Design," 1994-2007, pp. 1-2.

* cited by examiner

*Primary Examiner* — Thuy Dao
*Assistant Examiner* — Ben Wang
(74) *Attorney, Agent, or Firm* — Trop, Pruner & Hu, P.C.

(57) ABSTRACT

In one embodiment, the present invention includes a method for developing of a parallel program by specifying graphical representations for input data objects into a parallel computation code segment, specifying graphical representations for parallel program schemes, each including at least one graphical representation of an operator to perform an operation on an data object, determining if any of the parallel program schemes include at least one alternative computation, and unrolling the corresponding parallel program schemes and generating alternative parallel program scheme fragments therefrom. Other embodiments are described and claimed.

15 Claims, 5 Drawing Sheets

| Terminal Operators 10 | Functional | Connector | Splitter | Exit | | |
|---|---|---|---|---|---|---|
| | ☐ | ▷ | ⫸ | ■ | | |
| Control Operators 20 | Complex | Macros | If | Switch | While | For |
| | ⬣ | ⬣ | ⬣ | ⬣ | ⬣ | ⬣ |

| Scalar 30 | © (char)    Ⓕ (float)    Ⓓ (double)    Ⓘ (int)    Ⓢ (short)    Ⓛ (long) |
|---|---|
| | ● (abstract scalar-type)    ⬭ (encapsulated-scalar-array) |
| Structural 40 | ⋀ (vector)    ● (queue)    ▬ (stack) |

| Virtual 50 | ◇s (virtual_v)    ◇m (virtual_p)    ◇o (virtual_r) |
|---|---|

| PPL/G Pointers 60 | Read | Read - Erase | Write | Read – Erase - Write |
|---|---|---|---|---|
| | – – –▶ | ——▶ | ——▶ | ◀——▶ |

FIG. 1

ENABLING GRAPHICAL NOTATION FOR PARALLEL PROGRAMMING

BACKGROUND

With the increasing adoption of multiprocessor systems, many of which include multiple processors each having multiple cores, parallel programming is becoming more attractive. Specifically, parallel programming can be used to optimally separate independent tasks into processes to be run on the independent cores of one or more processors of the system.

To effect such parallel processing, various parallel processing languages exist. However, such parallel languages can be difficult to use. Furthermore, in such languages it can be difficult to perform code analysis, debugging, error checking and so forth. Thus many existing parallel computing languages and environments can be difficult to use, limiting their acceptance among users. Accordingly, although hardware platforms exist to handle parallel programming with coarse-grained processing elements, it can be challenging to perform procedure-level parallel computations on such platforms. Furthermore, when executing parallel programs on such systems, there can be inefficient usage of resources, leading to less than optimal processing, as well as increased power consumption.

BRIEF DESCRIPTION OF THE DRAWINGS

FIG. 1 is a graphical notation of various objects in accordance with one embodiment of the present invention.

DETAILED DESCRIPTION

Figure 2A:
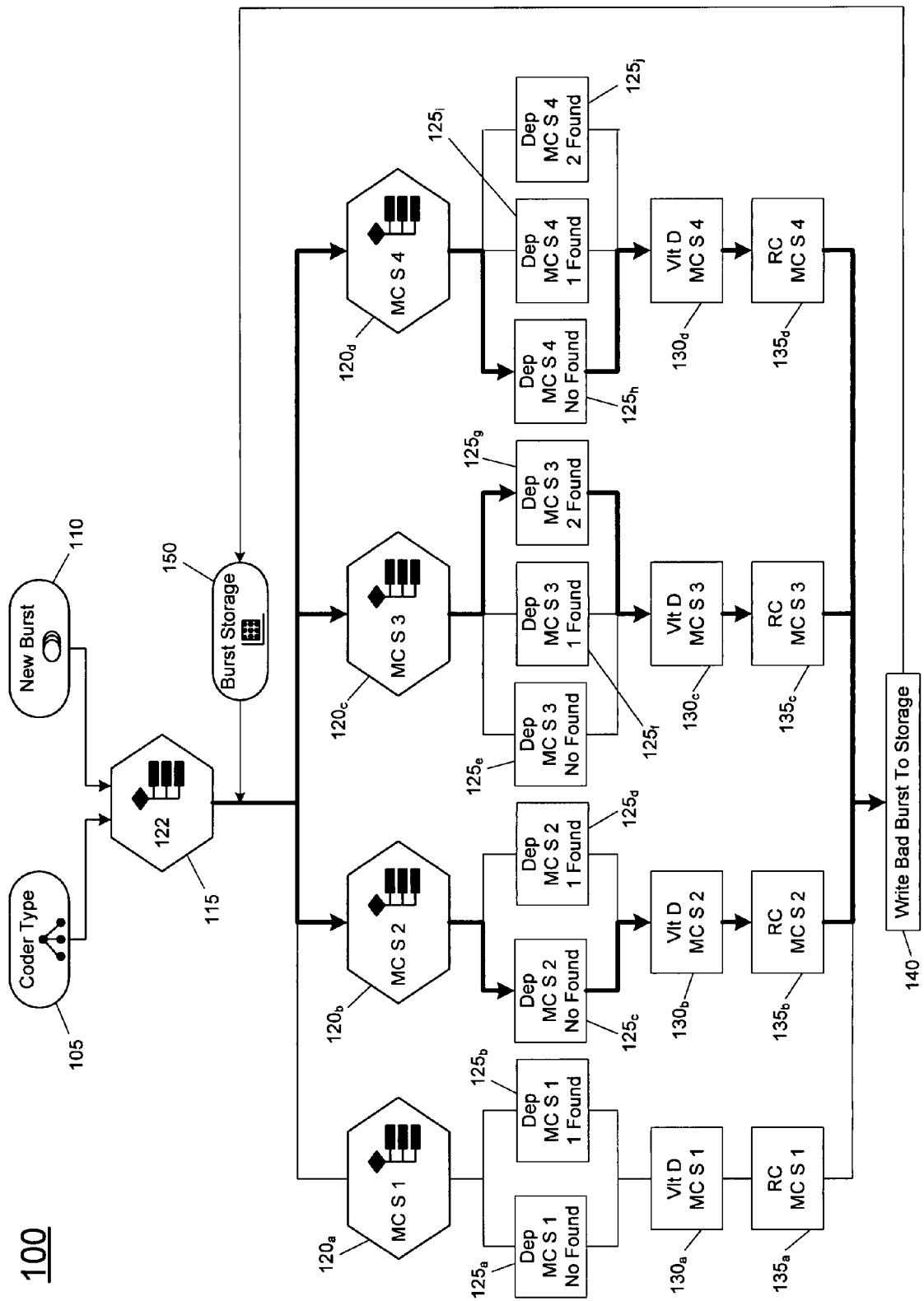
FIG. 2A is an ordinal parallel programming language graphical representation in accordance with one embodiment of the present invention.

In various embodiments, graphical notation may be used for representation of parallel programs to enable explicit visualization of the network nature of parallel programs. There are many hardware platforms that are initially developed as a parallel computing platform, and thus embodiments build a platform for procedure-level parallel computations with coarse-grained processing elements (PE). Such procedure-level parallelism is the main form and the main parallelism level for such platforms.

A graphical parallel programming language (referred to herein as PPL/G) is a language for programming coarse-grained parallel computations. At the PPL/G program level, a program may include three types of program objects: operators, data objects and PPL/G-pointers that link operators with data objects. A conceptual model of the PPL/G language sets formalism for the most general type of parallel computation: for dynamic parallel computations. A parallel program scheme such as a network of interacting nodes is transformed, in general, at every computation step, i.e., the graph itself is changed, but not only the graph marking as is done in data-flow computations or Petri nets.

Alternative computations (if, switch operations, etc.) can be implemented as static unrolling of parallel program scheme at compilation time, as well as generation of alternative parallel program scheme fragments at run time instead of routing data to one of multiple data-flow branches, which simultaneously occupy resources. Thus platform resources can be saved to reduce power consumption for example.

For coarse-grained parallelism, programming may be split into programming of a parallel program scheme and programming of an interpretation of its nodes—operators and data objects. Thus two levels of programming languages can be used in correspondence with each other: a PPL/G in accordance with an embodiment of the present invention for parallel computation scheme programming and conventional programming languages (C, embedded C, etc.) for sequential process programs.

Thus embodiments provide the explicit programming of a parallel program scheme. A parallel program scheme may be arranged as a network of interacting nodes, with its nodes representing operators and data objects. Operators are an abstraction of program active components such as functions, procedures, and tasks. Triggering of a corresponding operator node in a parallel program scheme is referred to as a "firing" (i.e., starting of execution). All interactions of processes are explicitly represented in the parallel program scheme. Operators interact through data objects. Data accessed by several operators are explicitly represented in the parallel program scheme as data objects. Data objects are an abstraction for any type of storage and communication channels which exist outside processes launched by operators can be used for operator interactions. Operators share a data object to which they have PPL/G pointers. Many operators can access a single shared data object. However only operators linked to the data object operators can access it. Thus there are shared data objects in PPL/G language but not a shared memory.

The defined basic set of data types enable convenience of further development of typical algorithms. The set of data objects can be extended according to programmer convenience and for satisfaction of application area representation. As shown in FIG. 1, various operators and data objects types in accordance with a parallel programming language may be used. Specifically, as shown in FIG. 1, a plurality of terminal operators 10 are available. Specifically, as shown in FIG. 1, such terminal operators 10 include functional, connector, splitter and exit operators. Furthermore, control operators 20 are available, including complex, macros, if, switch, while, and for operators. In addition, embodiments provide data objects including scalar data objects 30, including character, floating, double, integer, short, long, abstract scalar-type and encapsulated-scalar-array data types. A scalar data type is a set of data types which are represented as a single data object in a parallel program scheme. Its components cannot be presented at the PPL/G parallel program level, they have no individual state, and no operator PPL/G-pointers can be set directly to their components.

Data objects include structural data objects 40, such as vector, queue and stack objects. A structural data type is a set of data which is represented as a set of data objects in a parallel program scheme.

Data objects include virtual data objects 50, such as virtual_v, virtual_p and virtual_r. A virtual data object is a special data object category of the PPL/G language. They can be used only in a body description of control operators. Virtual data objects resemble formal parameters of procedures and functions in traditional programming languages.

Still further, PPL/G pointers 60 are provided, such as read, read-erase, write and read-erase-write, as shown in FIG. 1. Arcs (marked with an access type) link operator nodes of a program scheme with data object nodes. In the PPL/G a term link, i.e., a PPL/G-pointer, is used to represent arcs. A mark of an arc in a parallel program scheme is represented as pointer type or access type.

In the PPL/G language a capability to generate a user-defined program scheme fragment is given only to the special class of operators which belong to control operators. A control operator may include other operators and data objects, which can be generated when an operator snaps into action. For other operator types the PPL/G programming language defines general, outline interpretation (frame interpretation). A full interpretation will be given by a programmer in the sequential programming language, for example, C language. But it is defined that such operator cannot generate new program scheme fragments. Such operators are called terminal operators because they do not expand and instead run as a single sequential process.

Embodiments provide an ability to split parallel and traditional sequential programming: to organize parallel computations the programmer should not think about data processing implementation, should not use extensions in traditional sequential languages that are in nature oriented on sequential programming and have special dedicated language that is native for parallel programming. Also PPL/G is based on a formal computational model that guarantees that programs can be formally verified and will have predictable characteristics. Embodiments thus describe the fully functional and formalized mechanism for development of parallel programs in a native way with all the following features: (1) based on a strict formal computational model; (2) specialized programming language that is native for parallel programming; (3) represents parallel programs in graphical notation that is adequate representation of network nature of parallel programs; (4) the explicit programming of parallel program scheme, which is separated from programming of sequential data-processing routines; (5) language is algorithmic complete with its means for computations control at the level of a parallel program scheme in dependence of data values; (6) supports programming of either static or dynamic parallel computations; and (7) fully distributed shared data can be programmed using PPL/G. Thus PPL/G in accordance with an embodiment of the present invention can be designed as a scalable language in which standard and user definable operator types and data types can be used in PPL/G programs.

Referring now to FIG. 2A, shown is an ordinal parallel PPL/G program in accordance with one embodiment of the present invention. As shown in FIG. 2A, graphical representation 100 uses various graphical representations to identify different operators, data objects, data and control flow for parallel program structure. Specifically, as shown in FIG. 2A, graphical representation 100 receives a plurality of data from input data objects 105 and 110, i.e., from a vector structural object and a queue structural object, which are provided to a control operator 115, which may operate as a switch operator to provide data and control to a selected one or more of a plurality of parallel switch operators $120_a$-$120_d$, which in turn may provide data and control to zero, one or more of a plurality of parallel functional terminal operators $125_a$-$125_j$. The resulting data after data processing in such functional operators will be provided to yet another parallel plurality of functional terminal operators $130_a$-$130_d$, after which in turn will be provided to a still further layer of parallel functional operators $135_a$-$135_d$, which in turn will be provided to a single functional operator 140 which may write bad burst data to a storage, represented as an encapsulated scalar array 150. Of course while shown with this particular graphical representation in the embodiment of FIG. 2A, the scope of the present invention is not limited in this regard.

Figure 2B:
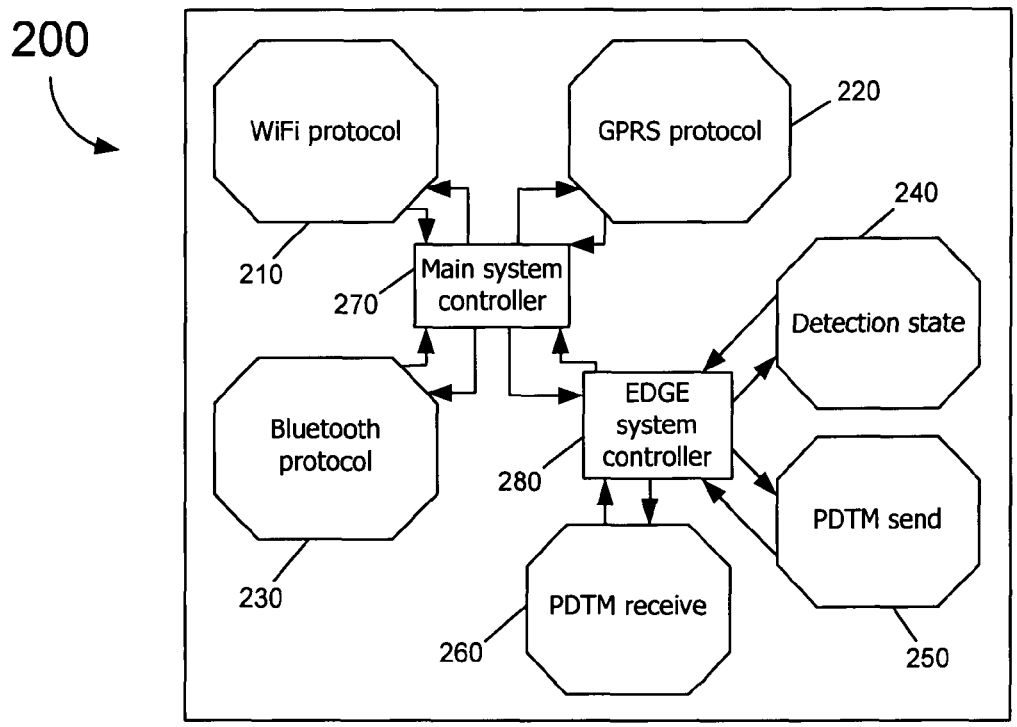
FIG. 2B is a high level representation of a program with dynamic unrolling in accordance with an embodiment of the present invention.

Referring now to FIG. 2B, shown is a high level representation of a parallel program with dynamic unrolling in accordance with an embodiment of the present invention. As shown in FIG. 2B, graphical representation 200 includes a pair of functional operators, namely a main system controller 270 and an enhanced data rates for GSM evolution (EDGE) system controller 280, both of which are linked to a plurality of control operators 210-260, each of which contains PPL/G scheme which after unrolling may perform a given function such as a short-range wireless protocol (e.g., a so-called Wi-Fi protocol) 210, a Bluetooth™ protocol 230, a cellular wireless protocol, such as a general packet radio services (GPRS) protocol 220. In turn, the control operator that represents the EDGE protocol is unrolled, so EDGE system controller 280 is linked by various arcs to EDGE protocol implementation sub-protocols: a detection state control operator 240 and send and receive control operators 250 and 260. Thus a program with dynamic unrolling may be represented by graphical notation using mechanisms of the present invention.

Figure 2C:
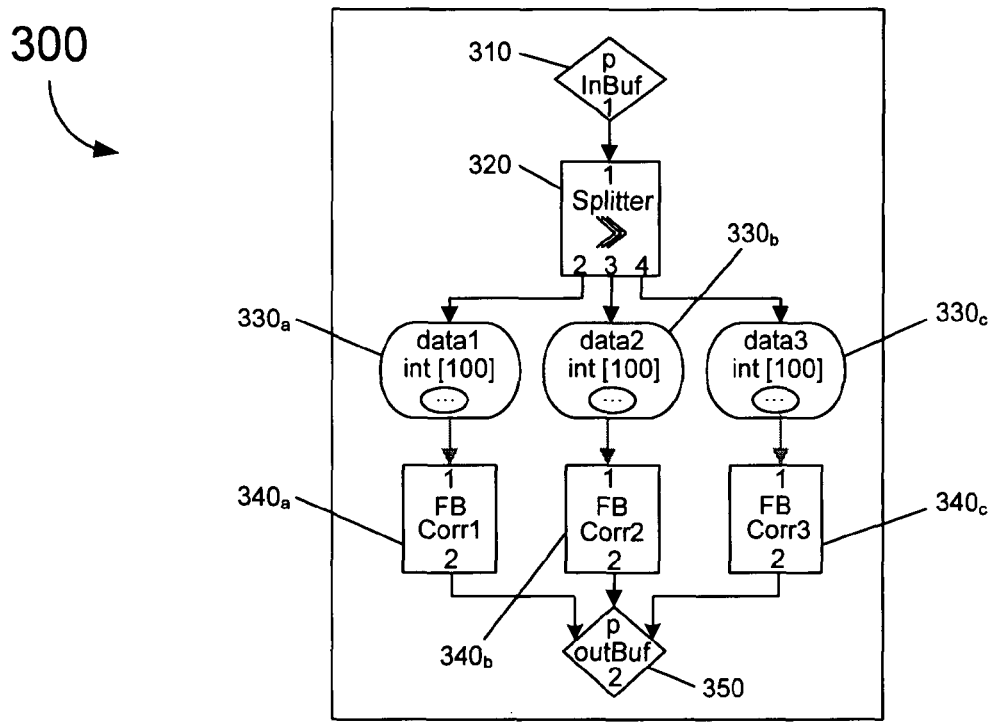
FIG. 2C is a graphical representation of a control operator body in accordance with an embodiment of the present invention.

Referring now to FIG. 2C, shown is a graphical representation of a control operator body in accordance with an embodiment of the present invention. As shown in FIG. 2C, graphical representation 300 includes a virtual data object 310, in which body input data is provided from, e.g., an input buffer into a splitter terminal operator 320, which splits the incoming data to all of a plurality of parallel data objects $330_a$-$330_c$, each of which is linked to a corresponding parallel functional terminal operator $340_a$-$340_c$, which may correspond to a front-back correlation operation, although the scope of the present invention is not limited in this regard. The resulting data from such parallel terminal operators $340_a$-$340_c$ are provided to a second virtual data object 350, which is associated with an output.

Figure 3:
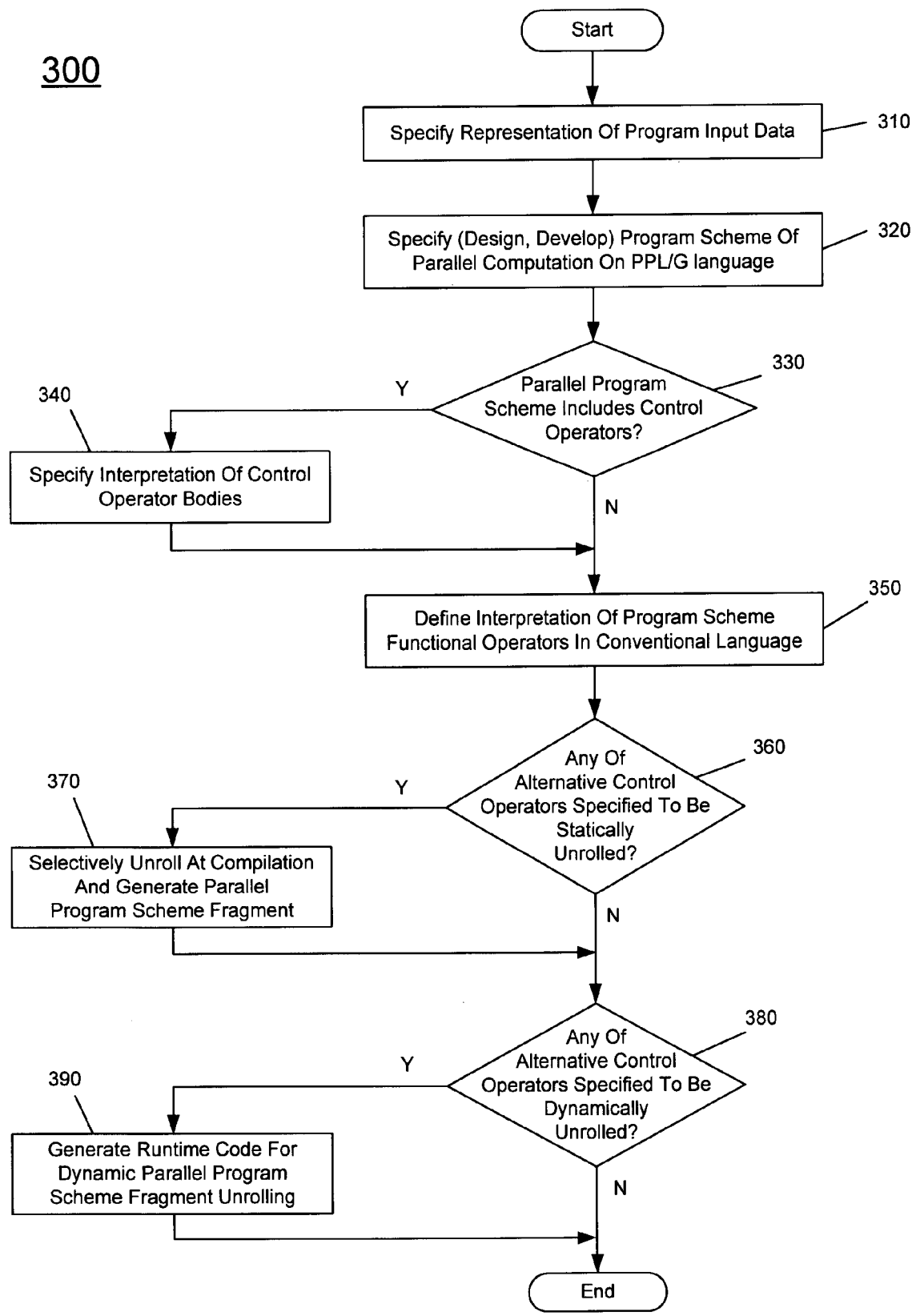
FIG. 3 is a flow diagram of a method in accordance with one embodiment of the present invention.

Referring now to FIG. 3, shown is a flow diagram of a method in accordance with one embodiment of the present invention. As shown in FIG. 3, method 300 may be used to create a graphical parallel PPL/G program in accordance with an embodiment of the present invention. Method 300 may begin by specification of a graphical representation of input data (block 310). For example, a programmer may select various data object types to identify each of different data to be operated on within the program. Then, these input data objects may be linked to PPL/G operators to specify a parallel computation scheme program. More specifically, as shown in FIG. 3, at block 320 graphical parallel computation scheme programming may be done by specifying PPL/G operators, data-objects and PPL/G pointers. Furthermore, any sequential process operations to be performed may be provided by conventional programming languages, e.g., C or another such language.

Referring still to FIG. 3, control may pass to diamond 330 where it may be determined whether any of the parallel program schemes include control operators (diamond 330). If yes, control passes to block 340, where the programmer specifies the program scheme fragment to interpret every control operator body (bodies) (block 340). Otherwise, control passes to block 350. At block 350 the programmer defines functional operator's interpretation in a conventional language (block 350). This step is the final step of the parallel program specification.

Referring still to FIG. 3, control may pass to diamond 360 where it may be determined whether any of the parallel program schemes include alternative control operators to be statically unrolled at compile time (diamond 360). While the scope of the present invention is not limited in this regard, such alternative computations may correspond to if operators, switch operators and so forth. If yes, control passes to block 370, where such parallel program schemes will be statically unrolled by compiler and parallel program schemes with alternative branches and conditional control and data switches will be generated in their place. The same processing is done for diamond 380 and block 390 to generate code for dynamic alternative branches unrolling at runtime.

Thus using such embodiments a programmer may specify and generate a parallel program scheme using graphical representation. Furthermore, instead of writing data to one of multiple data flow branches which simultaneously occupy resources, the dynamic unrolling and generation of alternative parallel program scheme fragments at program runtime may reduce consumption of platform resources, and furthermore provide for reduced power consumption. While shown with this particular implementation in the embodiment of FIG. 3, the scope of the present invention is not limited in this regard.

Figure 4:
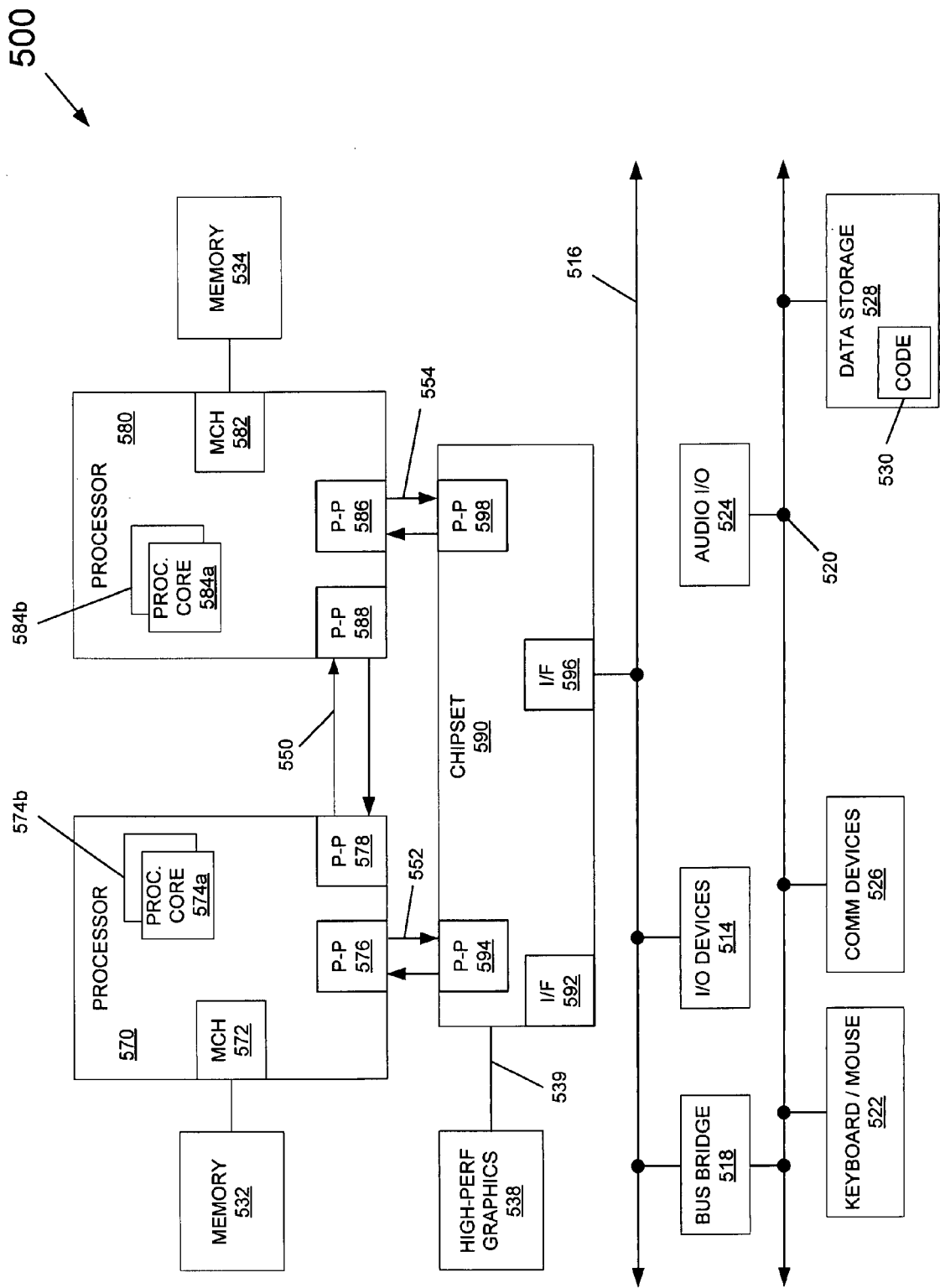
FIG. 4 is a block diagram of a multiprocessor system in which embodiments of the present invention may be used.

Embodiments may be suited for many different types of platforms. Referring now to FIG. 4, shown is a block diagram of a multiprocessor system on which graphical representations of parallel programs may be implemented to reduce power consumption in accordance with an embodiment of the present invention. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another architecture, such as a multi-drop bus, mesh, interconnection network or another implementation. As shown in FIG. 4, each of processors 570 and 580 may be multi-core processors including first and second processor cores (i.e., processor cores 574a and 574b and processor cores 584a and 584b), although other cores and potentially many more other cores may be present in particular embodiments.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538 via a bus 539.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method executed by a processor comprising:
specifying graphical representations for each of a plurality of data input into a parallel computation code segment;
specifying graphical representations for each of a plurality of parallel program schemes, each of which including at least one graphical representation of an operator to perform an operation on at least one of the plurality of data, wherein the operator graphical representations are linked to the data graphical representations with an arc including a pointer type that graphically represents differing operation types with differing graphic representations;
specifying interpretation of control operators in the parallel program schemes;
determining if any of the parallel program schemes include at least one alternative computation; and
generating static alternative parallel program scheme fragments or dynamically unrolling code for the corresponding parallel program schemes.

2. The method of claim 1, further comprising statically unrolling the corresponding parallel program schemes at compilation time, and dynamically unrolling the corresponding parallel program schemes at runtime.

3. The method of claim 1, further comprising providing code of a second programming language for sequential processing for any of the parallel program schemes including sequential processing.

4. The method of claim 1, wherein the plurality of data include scalar data objects, structural data objects, and virtual data objects.

5. The method of claim 4, wherein the structural data objects include vector objects, queue objects and stack objects.

6. The method of claim 4, further comprising marking an arc between data graphical representations and operator graphical representations with a pointer type representing an operation type or an access type.

7. The method of claim 6, further comprising sharing a data object by a plurality of parallel program operators and accessing the shared data object by one of the plurality of parallel program operators having pointers marked therebetween.

8. The method of claim 1, wherein the operators include terminal operators and control operators.

9. The method of claim 8, wherein the control operators include complex operators, macro operators, switch operators, while operators, for operators and the terminal operators include functional operators, connector operators, splitter operators and exit operators.

10. An article comprising a non-transitory machine-accessible medium including instructions that when executed cause a system to:
- specify graphical representations for each of a plurality of data objects into a parallel computation code segment;
- specify graphical representations for each of a plurality of parallel program schemes, each of which including at least one graphical representation of an operator to perform an operation on at least one of the data objects, wherein the operator graphical representations are linked to the data object graphical representations with an arc including a pointer type that graphically represents differing operation types with differing graphic representations;
- determine if any of the parallel program schemes include at least one alternative computation; and
- generate static alternate parallel program scheme fragments or dynamically unroll code for the corresponding parallel program schemes.

11. The article of claim 10, further comprising instructions that when executed enable the system to statically unroll the corresponding parallel program schemes at compilation time, and dynamically unroll the corresponding parallel program schemes at runtime.

12. The article of claim 10, further comprising instructions that when executed enable the system to mark an arc between one of the data object graphical representations and one of the operator graphical representations with a pointer type representing an operation type or an access type.

13. A system comprising:
- a microprocessor including a plurality of cores each to execute code of a parallel programming language in parallel; and
- a memory coupled to the microprocessor including instructions that when executed enable the system to generate representations for each of a plurality of data objects into a parallel computation code segment, generate representations for each of a plurality of parallel program schemes, each of which including at least one representation of an operator to perform an operation on at least one of the data objects, wherein the operator representations are linked to the data object representations with an arc including a pointer type that graphically represents differing operation types with differing graphic representations, and determine if any of the parallel program schemes include at least one alternative computation, and if so unroll the corresponding parallel program schemes and generate alternate parallel program scheme fragments therefrom.

14. The system of claim 13, wherein the memory further comprises instructions that when executed enable the system to statically unroll the corresponding parallel program schemes at compilation time.

15. The system of claim 14, wherein the memory further comprises instructions that when executed enable the system to mark an arc between one of the data object representations and one of the operator representations with a pointer type representing an operation type or an access type.

* * * * *